United States Patent [19]

Negishi

[11] 4,308,562
[45] Dec. 29, 1981

[54] AUTOMATICALLY LOADING MECHANISM FOR MAGNETIC RECORDING/REPRODUCING APPARATUS

[75] Inventor: Tokuji Negishi, Toda, Japan

[73] Assignee: Clarion Co., Ltd., Tokyo, Japan

[21] Appl. No.: 107,470

[22] Filed: Dec. 26, 1979

[30] Foreign Application Priority Data

Dec. 28, 1978 [JP] Japan .................. 53-178465[U]

[51] Int. Cl.³ .................. G11B 15/18; G11B 15/24
[52] U.S. Cl. .................. 360/71; 360/93; 360/96.5; 360/137
[58] Field of Search .................. 360/69–71, 360/93, 96.5, 96.6, 105, 137; 242/197–200

[56] References Cited

U.S. PATENT DOCUMENTS

| | | | |
|---|---|---|---|
| 3,669,457 | 6/1972 | Nozawa et al. | 360/93 |
| 3,972,072 | 7/1976 | Richt | 360/93 |
| 4,087,844 | 5/1978 | Takahashi et al. | 360/93 X |
| 4,173,028 | 10/1979 | Hyodo | 360/69 |

FOREIGN PATENT DOCUMENTS

| | | | |
|---|---|---|---|
| 2245004 | 3/1974 | Fed. Rep. of Germany | 360/93 |
| 44-41926 | 11/1969 | Japan | 360/93 |

*Primary Examiner*—John H. Wolff
*Attorney, Agent, or Firm*—Blanchard, Flynn, Thiel, Boutell & Tanis

[57] ABSTRACT

An automatically loading and unloading mechanism for a magnetic recording/reproducing apparatus. Tape pack detecting element is provided within an area where a tape pack is to be inserted. A cam member is operable by the tape pack detecting element to actuate a second slide member. The second slide member is provided with a gear meshable with a pinion provided on a first slide member, a worm wheel meshable with a gear portion of a rotating lever pivotally connected to a chassis together with a resetting spring, and an attracting portion for holding the second slide member in the actuated position by an electromagnetic mechanism. The rotating lever has a fork portion engageable with a guide formed on a slidable frame member and leading the guide along a bent slot formed on a guide member. An actuating lever is positioned so that it may be operated by the guide led along the bent slot. A motor for driving the pinion is incorporated in a power source circuit in relation with the electromagnetic mechanism. A power switch operated by the second slide member and an ejecting switch operated by an ejection operating portion are connected in the power source circuit.

7 Claims, 3 Drawing Figures

AUTOMATICALLY LOADING MECHANISM FOR MAGNETIC RECORDING/REPRODUCING APPARATUS

BACKGROUND OF THE INVENTION

1. Field of the Invention

This invention relates to an automatically loading mechanism for a magnetic recording/reproducing apparatus.

2. Description of the Prior Art

There have been proposed and practically employed various mechanisms for loading and unloading a tape pack into and out of a magnetic recording/reproducing apparatus. In general, to load and unload a tape pack called "two-real type cassette", it is essential to lower the tape pack received through a loading opening into a recording/reproducing position to establish a recording/reproducing mode and to raise the tape pack out of the recording/reproducing position and push out the tape pack from the loading opening to complete a tape pack ejecting operation. To attain these operations, generally, a deck member etc. must be operated. This operation encounters considerable resistances, and desired smooth loading and unloading operation cannot always be expected.

The inventor of the present invention has therefore proposed a mechanism free from the aforesaid disadvantages involved in the known mechanisms and capable of automatically loading and unloading the tape pack in Japanese Utility Model Application filed on November 21, 1978. This proposal is very effective to automatically carry out tape pack loading and unloading. However, the mechanism according to this proposal needs a drive mechanism operatable through engagement between a rack and a pinion. The rack to be employed in the proposed mechanism has a bent formation and the structure for operating the pinion along such a bent rack becomes inevitably complicated. More particularly, the structure requires special components or arrangements such as a T-shaped operating lever, overlapped spring arrangement, etc. In addition, the operating load is large and it is difficult to attain a stable operation.

OBJECTS OF THE INVENTION

Accordingly, it is a primary object of the present invention to provide an automatically loading mechanism for a magnetic recording/reproducing apparatus, which is capable of automatically loading and unloading a tape pack by a light operation and yet capable of carrying out the operation accurately.

SUMMARY OF THE INVENTION

In accordance with the present invention, there is provided an automatically loading mechanism for a magnetic recording/reproducing apparatus which comprises: a slidable frame member for receiving a tape pack therein; means for detecting the tape pack loaded in said slidable frame member; cam means actuatable by said detecting means; guide means for guiding a sliding movement of said slidable frame member; first resetting spring means; a first slide member which is urged by said first resetting spring means; second resetting spring means; a second slide member which is urged by said second resetting spring means; first switch means adapted to close and open upon actuation of said second slide member by said cam means; a motor adapted to be controlled by said first switch means; first engaging means provided on said first slide member and rotatable by said motor; second engaging means provided on said second slide member and engageable with said first engaging means upon actuation of said second slide member by said cam means; third resetting spring means; first rotating means urged by said third resetting spring means and engaged with said slidable frame member; third engaging means adapted to be driven by said second engaging means and to be engaged with said first rotating means for rotating said first rotating means; and holding means controllable by said switch means for holding the engagement between said first and said second engaging means; said first rotating means being adapted to rotate until the tape pack received in said slidable frame member reaches a recording/reproducing position of said magnetic recording/reproducing apparatus.

PREFERRED EMBODIMENT OF THE INVENTION

Figure 1:
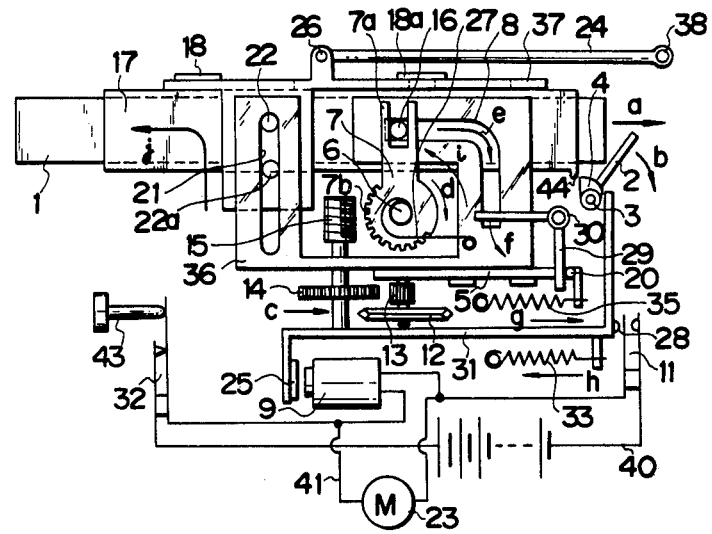
FIG. 1 is an explanatory sectional view of an automatically loading mechanism in accordance with the present invention, illustrating a state before it is operated.

Referring now to the drawings, there is illustrated a preferred embodiment of the present invention. A pair of guide members 36 each having a vertical guide slot 21 and a guide slot 8 crooked into an inverted L-shape are fitted to a chassis of a magnetic recording/reproducing apparatus at opposite positions of an opening for loading a tape pack 1. A support member 37 is provided between said pair of guide members 36 and 36 and has on opposite outer sides thereof guide pins 22 and 22a, respectively. The guide pins 22 and 22a and a guide pin 16 provided on a slidable frame member 17 engage with the slot 21 and the slot 8, respectively. The support member 37 engages with the slidable frame member 17 through guides 18 and 18a. At the rear of the slidable frame member 17, a rotatable lever 2 acting as tape pack detecting means and a cam member 4 are pivotally supported at a base portion thereof on the chassis by a pivotal shaft 3.

The support member 37 is pivotally connected intermediate the ends thereof to a connecting rod 24 by a pivot 26. The base end of the connecting rod 24 is pivotally supported on the chassis by a pivotal shaft 38. The connecting rod 24 is thus adapted to be lowered and raised conjointly with the slidable frame member 17 and the tape pack received therein. A first slide member 5 is provided under the guide members 36 and slidable relative to the guide members 36. The slide member 5 has a spring 35 provided between the member 5 and the chassis so that the member 5 is urged or biased leftwardly as viewed in the figures. The slide member 5 further has a lock pin 20 provided at the rear and side portion thereof. The pin 20 engages with one end of an L-shaped actuating lever 29 pivotally supported at 30 by the chassis. Another end of the actuating lever 29 is normally positioned in the vicinity of a lower end portion of the slot 8.

On the other hand, a second slide member 31 is arranged so that the upper end thereof may be located in a position where it is engageable with the cam member 4. A spring 33 is provided between the slide member 31 and the chassis so that the slide member 31 is urged or biased leftwardly as viewed in the figures. The second slide member 31 has a gear 14 and a worm wheel 15 mounted coaxially thereon. The gear 14 is meshable with a pinion 13 mounted on the first slide member 5. The pinion 13 is rotatable by a pulley 12 which is coaxial with the pinion 13 and rotatable by a motor 23. However, when the slidable frame member 17 is in its raised position, the pinion 13 is disengaged from the gear 14 through locking of the actuating lever 29 with the lock pin 20 as illustrated in FIG. 1. The second slide member 31 has, at a forward vertical portion thereof, an attractable member 25 and has, at a rear portion thereof, a switch operating portion 28. The attractable member 25 and the switch operating portion 28 are isolated from an electromagnetic mechanism 9 and a power source 11, respectively, when the slidable member 17 is in its raised position as illustrated in FIG. 1. A rotating lever 7 is rotatably mounted on the chassis by a shaft 6. A spiral spring 27 for resetting the rotating lever 7 is fitted on the rotating lever 7. The rotating lever 7 has at the base end portion thereof a geared periphery 7b and at the tip end portion thereof a fork portion 7a. The fork portion 7a is so shaped that it may receive the guide pin 16 therein. In relation with the electromagnetic mechanism 9 provided oppositely to the attractable member 25, a power source circuit 40 and a motor circuit 41 are connected with each other as illustrated in the figures. The normally open power source switch 11 and a normally closed ejecting switch 32 are incorporated in the power source circuit 40. The switch 32 has an operating button 43 provided on the chassis so that the switch 32 may be opened by depressing the operating button 43.

A spring is provided for the connecting portion of the rotating lever 2 so that the lever 2 is urged to return to its original position. As the lever 2 is required to be displaced out of a space where the slidable frame member 17 and the tape pack 1 occupy when they are lowered, the spring is preferred to be a coil spring for pressing the rotating lever 2 horizontally outwardly. The lever 2 has, at the inside thereof, a cam portion which is engageable with a projection 44 formed at the rear end of the slidable frame member 17 to displace the lever 2 sidewardly. A stopper 10 is provided at the rear of the loading space of the tape pack 1.

Figure 2:
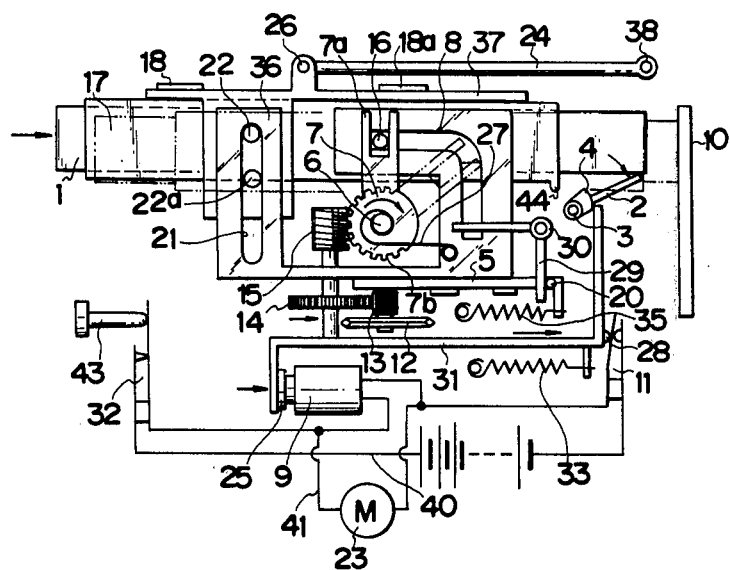
FIG. 2 is a similar explanatory sectional view of the automatically loading mechanism, illustrating a state where a second slide member is actuated by a rotating lever and a cam member.
Figure 3:
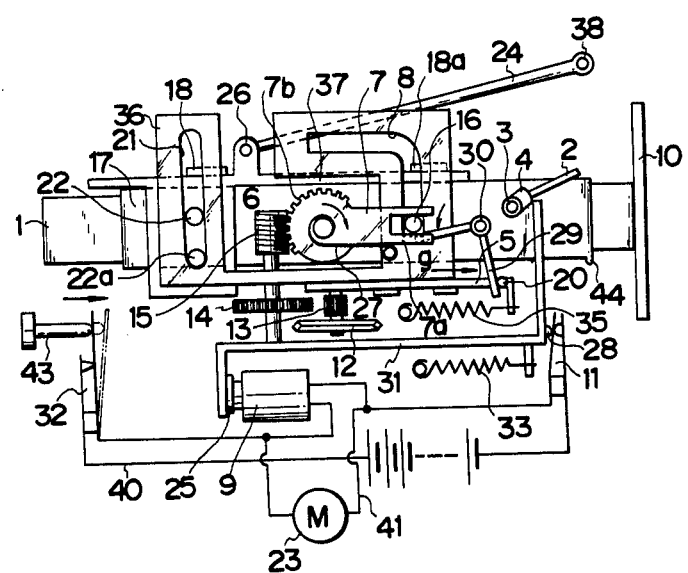
FIG. 3 is a similar explanatory sectional view of the automatically loading mechanism, illustrating a state where a slidable frame member is lowered in a recording/reproducing position by the operation of the rotating lever.

In the arrangement as mentioned above, it will be seen that in the course of loading of the tape pack 1 into the slidable frame member 17 in a direction of a, the slidable frame member 17 is not moved while the tape pack alone is being moved inwardly. When the rear end of the tape pack 1 is further moved inwardly from a position as illustrated in FIG. 1, it is brought into engagement with the rotating lever 2 to rotate the lever 2 with the cam member 4 around the shaft 3 in a direction of b. At this time, the cam member 4 is brought into engagement with an upper end portion of the second slide member 31 to displace the second slide member 31 in a direction of c. Thus, the gear 14 is caused to engage with the pinion 13 and the worm wheel 15 is also caused to engage with the gear 7b. Concurrently, the operating portion 28 closes the switch 11 to make the power source circuit 40 and the motor circuit 41 operate the motor 23. More specifically, upon making the power supply circuit, the electromagnetic mechanism 9 attracts the attractable member 25 to hold the slide member 31 in a position where the engagement between the gear 14 and the pinion 13 and the engagement between the gear 7b and the worm wheel 15 are established. In addition, as the motor 23 operates, the pinion 13 is rotated through the pulley 12 and the gear 7b is driven to rotate the rotating lever 7, so that the slidable frame member 17 holding the tape pack therein is further transported inwardly. When the slidable frame member 17 is thus transported, the rear end of the tape pack 1 is brought into contact with the stopper 10 and further retreat of the tape pack 1 is prevented. However, since the slidable frame member 17 continues to be subjected to a pushing operation by the motor 23 after the retreat of the tape pack 1 is stopped by the stopper 10, the slidable frame member 17 is caused to be lowered according to the rotation of the rotating lever 7 after it reaches a corner of the slot 8 as illustrated by a phantom line in FIG. 2. At the last stage of the lowering of the slidable frame member 17, the engaging pin 16 engages with the L-shaped lever 29 and rotate the same to displace the first slide member 5 in a direction of an arrow g as illustrated in FIG. 3. As a result, the engagement between the pinion 13 and the gear 14 is released, but the worm wheel 15 and the gear 7b are still in mesh with each other so that the slidable frame member 17 and the tape pack 1 are held in the lowered position. This lowered position is a recording/reproducing position, and recording/reproducing operation is performed in the position by bringing a tape in the tape pack 1 to a head by operating a capstan and a pinch roller in a conventional manner.

An ejecting operation after completion of the recording/reproducing operation is carried out by operating the ejection operating button 43. More specifically, upon depression of the button 43, the switch 32 is opened so that the attractable member 25 is released from the electromagnetic mechanism 9. As a result, the second slide member 31 returns to a position as illustrated in FIG. 1 by the resetting action of the spring 33 and the gear 7b is disengaged from the worm wheel 15. At the same time, the switch 11 is opened. Thus, the tape pack 1 and the slidable frame member 17 are no longer held in the recording/reproducing position. The rotating lever 7 is reset by the action of the spring 27, the pins 22 and 22a of the support member 37 and the pin 16 of the slidable frame member 17 are pulled upwardly relative to the vertical portions of the slots 21 and 8, respectively, and the slidable frame member 17 is moved horizontally along a horizontal portion of the slot 8 after the pins have reached at their respective uppermost position.

Although a pair of guide members 36 are provided on opposite sides of the tape pack loading opening and various components related to the guide members 36 are provided for each of the guide members 36 in the embodiment as illustrated, one guide member and components associated therewith will suffice to attain the object of the present invention.

As mentioned above, according to the present invention, the loading of the tape pack 1 can be carried out by such a small force as required only for operating the rotating lever 2 and the cam member 4 to slightly displace the second slide member 31 because the tape pack 1 and the slidable frame member 17 are automatically fed to the recording/reproducing position by the motor after the second slide member 31 has been displaced. The ejecting operating can also be automatically carried out after the button 43 is depressed to break the power source circuit. Furthermore, as can be understood from the foregoing description that the aforesaid automatic loading and ejecting are attained essentially by moving the guide pin 16 of the slidable frame member 17 along the slot 8 by using the rotating lever 7 with the gear 7b to lower and pull upwardly the slidable frame member, the structure of the automatically loading mechanism of the present invention is simple in structure and accurate and stable in operation.

I claim:

1. An automatic tape pack loading mechanism for a magnetic recording/reproducing apparatus which comprises:
   a slidable frame member for receiving a tape pack therein;
   means for detecting the tape pack when it is loaded in said slidable frame member;
   cam means actuatable by said detecting means;
   guide means for directing the sliding movement of said slidable frame member;
   first resetting spring means;
   a first slide member which is urged by said first resetting spring means toward a first position;
   second resetting spring means;
   a second slide member which is urged by said second resetting spring means toward a second position, said second slide member being movable by said cam means away from said second position when the tape pack is loaded in said slidable frame member;
   first switch means adapted to be selectively closed or opened in response to movement of said second slide member of said second slide member away from or toward said second position, respectively;
   a motor adapted to be controlled by said first switch means;
   first engaging means provided on said first slide member and rotatable upon actuation of said motor;
   second engaging means provided on said second slide member and engageable with said first engaging means upon movement of said second slide member by said cam means away from said second position;
   third resetting spring means;
   first rotatable means urged by said third resetting spring means to a third position, said first rotatable means being engaged with said slidable frame member;
   third engaging means coupled to and driven by said second engaging means and and adapted to selectively engage said first rotatable means for rotating said first rotatable means away from said third position when said motor is actuated; and
   holding means controllable by said first switch means for maintaining the engagement between said first and said second engaging means;
   said first rotatable means being adapted to rotate until the tape pack received in said slidable frame member reaches a recording/reproducing position within said magnetic recording/reproducing apparatus.

2. An automatic loading mechanism as claimed in claim 1, which further comprises:
   fourth engaging means provided on said slidable frame member for engaging said first rotatable means; and
   second rotatable means adapted to be engaged with said fourth engaging means at the last stage of the rotation of said first rotating means and rotatable thereby to displace said first slide member in a direction away from said first position and thus releasing said first engaging means from the engagement with said second engaging means.

3. An automatic loading mechanism as claimed in claim 1, which further comprises ejection operating means for deenergizing said holding means.

4. An automatic loading mechanism as claimed in claim 1, wherein said means for detecting the tape pack is a lever member rotatable by said tape pack.

5. An automatic loading mechanism as claimed in claim 1, wherein said third engaging means is a worm wheel and said first rotatable means has a gear meshable with said worm wheel.

6. An automatic loading mechanism as claimed in claim 2, wherein said guide means has an inverted L-shaped slot and said fourth engaging means is adapted to be guided along said inverted L-shaped slot by said first rotatable means.

7. An automatic loading mechanism as claimed in claim 3, wherein said ejection operating means includes a manually operating button for effecting ejection, second switch means adapted to be closed or opened by operation of said button and said second switch means is connected to said holding means.

* * * * *